United States Patent [19]
Miron

[11] Patent Number: 5,652,588
[45] Date of Patent: Jul. 29, 1997

[54] SURVEILLANCE SYSTEM INCLUDING A RADAR DEVICE AND ELECTRO-OPTICAL SENSOR STATIONS

[75] Inventor: Raffi Miron, Haifa, Israel

[73] Assignee: The State of Israel, Ministry of Defence, Rafael Armament Development Authority, Tel-Aviv, Israel

[21] Appl. No.: 544,465

[22] Filed: Oct. 18, 1995

[30] Foreign Application Priority Data

Oct. 28, 1994 [IL] Israel ......................................... 111435

[51] Int. Cl.$^6$ ................................................. G01S 13/86
[52] U.S. Cl. ................................................ 342/58; 342/54
[58] Field of Search ................................... 342/52, 53, 54, 342/55, 58

[56] References Cited

U.S. PATENT DOCUMENTS

| | | | |
|---|---|---|---|
| 3,924,232 | 12/1975 | Burdi et al. | 342/54 |
| 4,050,068 | 9/1977 | Berg et al. | 342/53 |
| 4,780,719 | 10/1988 | Frei et al. | 342/53 |
| 5,134,409 | 7/1992 | De Groot | 342/53 |

*Primary Examiner*—Daniel T. Pihulic
*Attorney, Agent, or Firm*—Nikaido Marmelstein Murray & Oram LLP

[57] ABSTRACT

A dual-mode surveillance system with a radar and an electro-optical mode. The radar mode is afforded by a conventional manned radar surveillance station fitted with an imaging assembly. The electro-optical mode is afforded by means of at least one electro-optical surveillance station with tracking capability located remote of the manned radar surveillance station.

13 Claims, 3 Drawing Sheets

SURVEILLANCE SYSTEM INCLUDING A RADAR DEVICE AND ELECTRO-OPTICAL SENSOR STATIONS

FIELD AND BACKGROUND OF THE INVENTION

The present invention concerns radar-based surveillance systems.

Radar surveillance systems belong to the category of equipment used to detect objects out of the range of human sight. Quite generally, radar equipment, which may be stationary or mobile, is used for a host of purposes such as air and marine traffic control, detection and destruction of hostile objects and platforms such as in air defence, as navigational aids for aircraft and ships, and even for the study of bird flight patterns.

Known radar systems suffer from operational problems in that their functioning is impaired by terrain topography constraints giving rise to so-called hidden areas or dead zones not accessible to a radar beam emitted from a given radar station; and from an intrinsic inability of positive object identification which frequently leads to uncertainty as to the nature of a detected object and consequently to false alarm. Furthermore, as radar systems emit radiation while in operation, they are prone to be detected at an early stage of operation, which in the case of hostilities allows an enemy to take evasive maneuvers, to operate electronic counter-measures, send decoys and launch radiation-homing missiles against the radar station of an air defense system.

The intrinsic insufficiency of radar systems is due to the fact that they display on the radar screen so-called "blips" which are far away from proper pictures and which many times leave the operator perplexed as to what they really represent. In case the detected object is a friendly, manned platform, its nature and identity can be established by interrogation. However, in case of hostile platforms, inanimate objects or non-human living objects such a verification method is not available.

EP 0205794 and the corresponding U.S. Pat. No. 4,780,719 disclose a surveillance system comprising an infrared target data acquisition device operatively coupled to a radar search and tracking device. The infrared data acquisition device does not have any range measurement capability and accordingly, for the range determination on the basis of the elevation and azimuth angle values fed to the radar to be meaningful, the acquisition device must be juxtaposed to the radar device.

U.S. Pat. No. 5,134,409 discloses a surveillance sensor comprising a radar antenna with a co-located and co-rotating electro-optical sensor device, whereby some of the short-comings of the prior art are allegedly overcome.

Both the above known systems do not take into account the range difference between a radar device, which is of the order of about 200 km, and an optical sensor which as a rule, is of the order of about 30 km only. Accordingly, in surveillance systems which comprise juxtaposed radar and optical sensor devices, the benefit afforded by the optical sensor device can inherently become manifest only at a relatively short range from the radar post, which means that an object will be viewed close to or even over the surveyed area. Clearly, this is a serious disadvantage.

BRIEF DESCRIPTION OF THE INVENTION

It is the object of the present invention to provide an improved surveillance system comprising a radar system with optical enhancement so as to overcome the problems intrinsic in radar surveillance alone. More specifically, the invention aims at providing a dual mode, improved surveillance system with imaging capability.

In accordance with the present invention there is provided a surveillance system comprising:

i) a manned surveillance station with radar surveillance equipment including a radar device, a radar display screen and radar processor means;

ii) at least one electro-optical surveillance station with tracking capability remote of the manned surveillance station and comprising at least one electro-optical sensor means mounted on a pedestal with tracking drive means and having at least two degrees of rotational freedom for azimuth and elevational adjustments; remote station processor means capable of receiving from the radar equipment travel path characterizing data of a moving object, of processing images acquired by the electro-optical sensor means, and of transmitting the images to the manned surveillance station; and iii) an imaging assembly in association with the manned surveillance station comprising add-on processor means in association with video display means, and communication interface means linked to each of the at least one electro-optical surveillance station, add-on processor means and radar processor means.

The at least one electro-optical surveillance station may be stationary or mobile. When mobile, each electro-optical surveillance station will comprise means for reporting continuously its location data.

The nature of the travel path characterizing data depends on the object of surveillance. For example, in the case of air surveillance the travel path characterizing data include location and trajectory data of a moving flying object.

If desired, the at least one electro-optical surveillance station may comprise video-tracker means whereby such station can track an object independent of data from the radar surveillance equipment.

The invention further provides an electro-optical surveillance station with tracking capability for use in a surveillance system of the kind specified, comprising at least one electro-optical sensor means mounted on a pedestal with tracking drive means and having at least two degrees of rotational freedom for azimuth and elevational adjustment, processor means capable of receiving radar-acquired data and of processing images acquired by the electro-optical sensor means.

If desired, the electro-optical surveillance station may also comprise video-tracker means.

Still further, the invention provides an add-on imaging assembly for hooking on to a radar station in a surveillance system of the kind specified, comprising add-on processor means in association with video display means and communication interface means for linking to at least one electro-optical surveillance station, add-on processor means and radar processor means.

The electro-optical sensor means in an electro-optical surveillance station of a surveillance system according to the invention, also referred to herein occasionally as "remote station", is of a kind known per se such as, for example a T.V., IR or thermal imaging camera.

It is thus seen that, in departure from the prior art, in accordance with the present invention the shorter operational range of the electro-optical sensor means as compared to that of radar devices is compensated by the fact that the at least one electro-optical surveillance station is remote of the radar equipment, whereby the effective range of the optical surveillance measured from the manned surveillance post where the radar equipment is located, is significantly increased. If desired, by adequately positioning at least one of the electro-optical surveillance stations, it is possible to make the ranges of the optical and radar surveillance essentially coextensive.

Where in a surveillance system according to the invention two or more electro-optical surveillance station operate simultaneously, the video display means will show simultaneously more than one image in a split screen mode.

By one embodiment, an electro-optical surveillance station in a surveillance system according to the invention has more than one electro-optical sensor operating in different ranges of the electromagnetic radiation spectrum, all aligned along the same optical axis. In such a case two or more images are acquired simultaneously and are displayed either in full overlap or in a split screen mode.

As a rule the surveillance station add-on assembly also comprises an input device by which the operator can in operation designate for optical tracking one of the objects tracked by the radar and appearing on the radar display screen and forward the designation to a remote station.

Where a surveillance system according to the invention comprises more than one remote electro-optical surveillance station, the location coordinates of each remote station are stored in the memory of the add-on processor means, whereby the latter is capable of automatically selecting for tracking duty a first remote station in best position and optical condition to acquire and track the designated object that had been tracked by the radar system; and for automatically transferring the tracking duty to a second remote station once the latter is in a better position than the first remote station; and to repeat such transfer as may be required.

If desired, the surveillance station add-on assembly in a surveillance system according to the invention may include video tape recording and display means for recording images and data useful for display in real-time or after a delay, as may be required. Real-time display is useful, for example, for monitoring an ongoing operation in order to decide on a further course of action, e.g. for monitoring an encounter with a gang of smugglers or the interception of hostile aircraft or missiles. To enable simultaneous monitoring of an ongoing action and tracking of an oncoming threat, it is preferable in accordance with this embodiment of the invention to have two separate video display means, one for tracking and the other for monitoring.

In a surveillance system according to the invention each of the remote electro-optical surveillance stations may, if desired, be fitted with range finder means with its line of sight aligned with the electro-optical means. Alternatively, the range of a tracked object may be determined by simultaneously sighting the object by at least two remote stations, in which case the range of the object is computed by triangulation. In either case, the azimuth angle, elevation and range data acquired by one or more of the remote electro-optical surveillance stations enables autonomous video tracking by each of the stations and also, by interaction with the add-on processor of the add-on assembly, an autonomous transfer of the surveillance duty from the current to the next remote station.

It is thus seen, that in accordance with the present invention there is provided a dual-mode surveillance system with a radar mode and an electro-optical mode. As will be explained in the following, depending on the requirements and circumstances the two modes are operated simultaneously or successively.

When deploying a surveillance system according to the invention, the remote electro-optical surveillance stations are positioned at carefully selected emplacements. In case of only one single remote station, the location thereof is judiciously selected so as to cover an area of special interest within the surveillance area of the radar equipment. When the surveillance system comprises two or more remote stations, they are so deployed that the surveillance areas of two neighboring stations are at least tangent or even better, partially overlapping.

DESCRIPTION OF THE DRAWINGS

For better understanding the invention will now be described, by way of example only, with reference to the annexed drawings, in which.

DESCRIPTION OF SPECIFIC EMBODIMENTS

Figure 1:
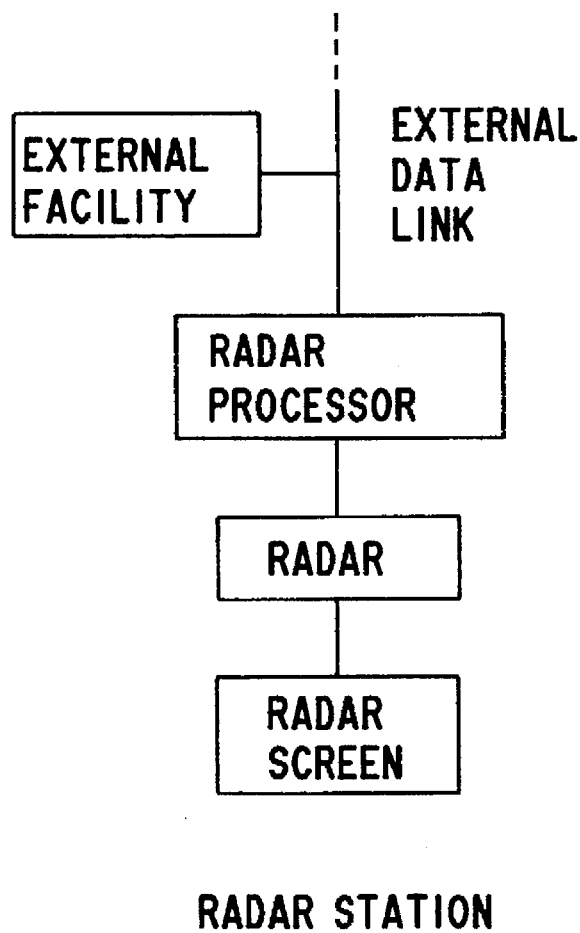
FIG. 1 is a diagram of a conventional prior art radar surveillance equipment.

The radar equipment shown in FIG. 1 is part of a conventional prior art radar surveillance system and comprises a radar device, a radar processor and a radar display screen, the radar processor being capable of linkage to an external facility such as another radar station or any kind of communication, control or intelligence facility. Once the radar surveillance is functioning, the operator can detect objects appearing as so-called "blips" on the radar display screen, and for object identification and validation the operator may receive corroborating information from an external facility or several such facilities.

Figure 2:
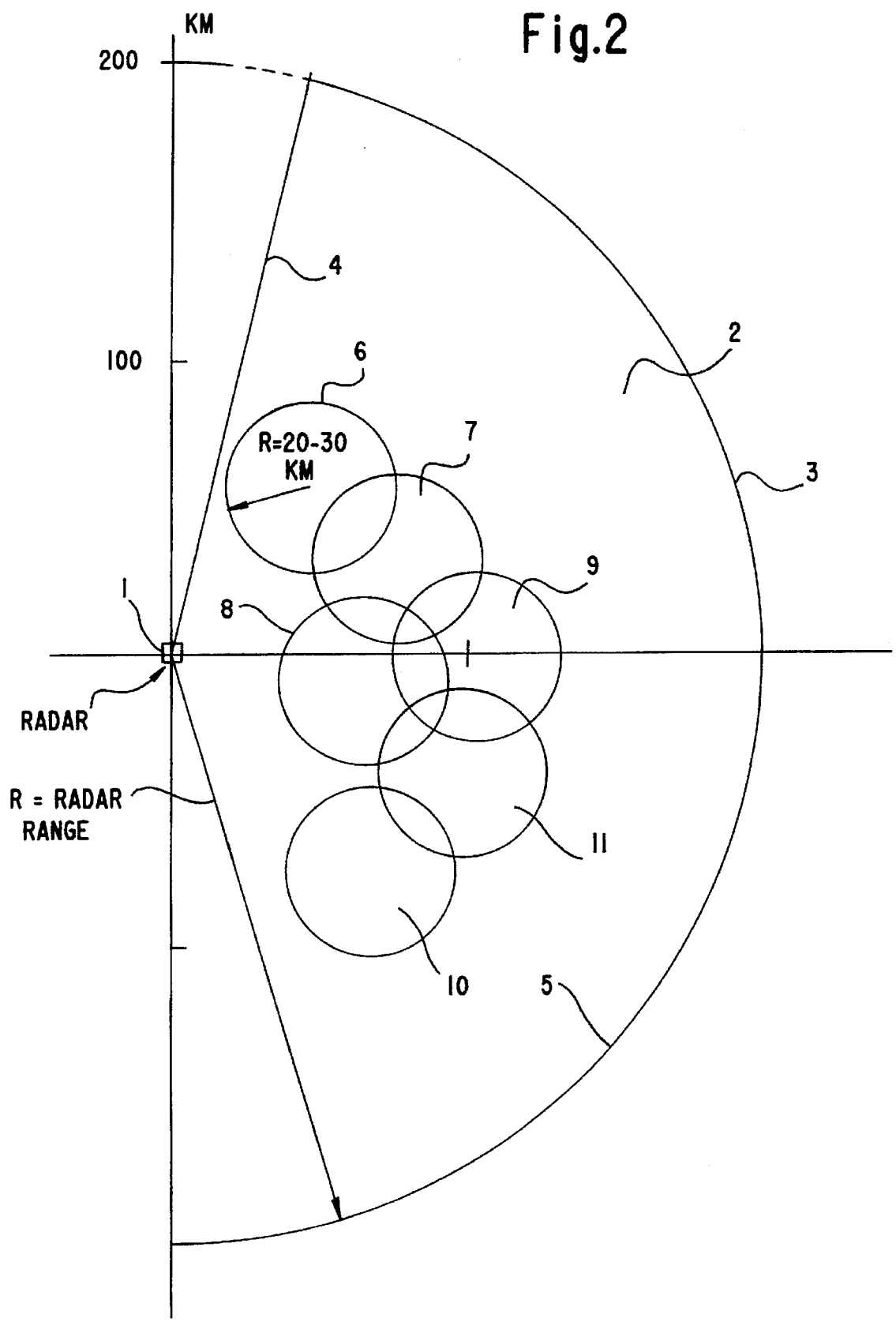
FIG. 2 is a diagrammatic layout of the deployment of a plurality of remote electro-optical surveillance stations in a surveillance system according to the invention.

Turning now to FIG. 2, there is shown the layout of a surveillance system according to the invention. As shown, in accordance with the invention the radar device of the system is designed to cover a surveillance area 2 in form of a circular sector whose radius R is equal to the radar range, say about 200 km, and whose boundaries are defined by the perimeter line 3 and the radial lines 4 and 5 forming between them an obtuse angle of about 150°. Within the surveillance area 2 there are deployed a number of remote electro-optical tracking stations 6–11, each governing a circular optical surveillance area whose radius corresponds to the maximum detection range of the electro-optics of the station which, depending on the nature of the electro-optics, may be about 20–30 km. As shown, neighboring circular optical surveillance areas overlap. The various stations may form together a network with autonomous decision-making capability by which at any time the most suitable station from amongst stations 6–11 is assigned for tracking. If two or more stations track simultaneously, then the precise spatial position of a target may be determined by triangulation. The partial overlap between neighboring circular optical surveillance areas aims at ensuring that there will be no interruption of surveillance when tracking passes from one station to another. Alternatively, neighboring optical surveillance areas may be mutually tangential. If desired, some or all of the remote optical surveillance stations 6–11 may be placed closer to the perimeter line 3. Also if desired, the radar assembly may cover a full-circular surveillance area.

Figure 3:
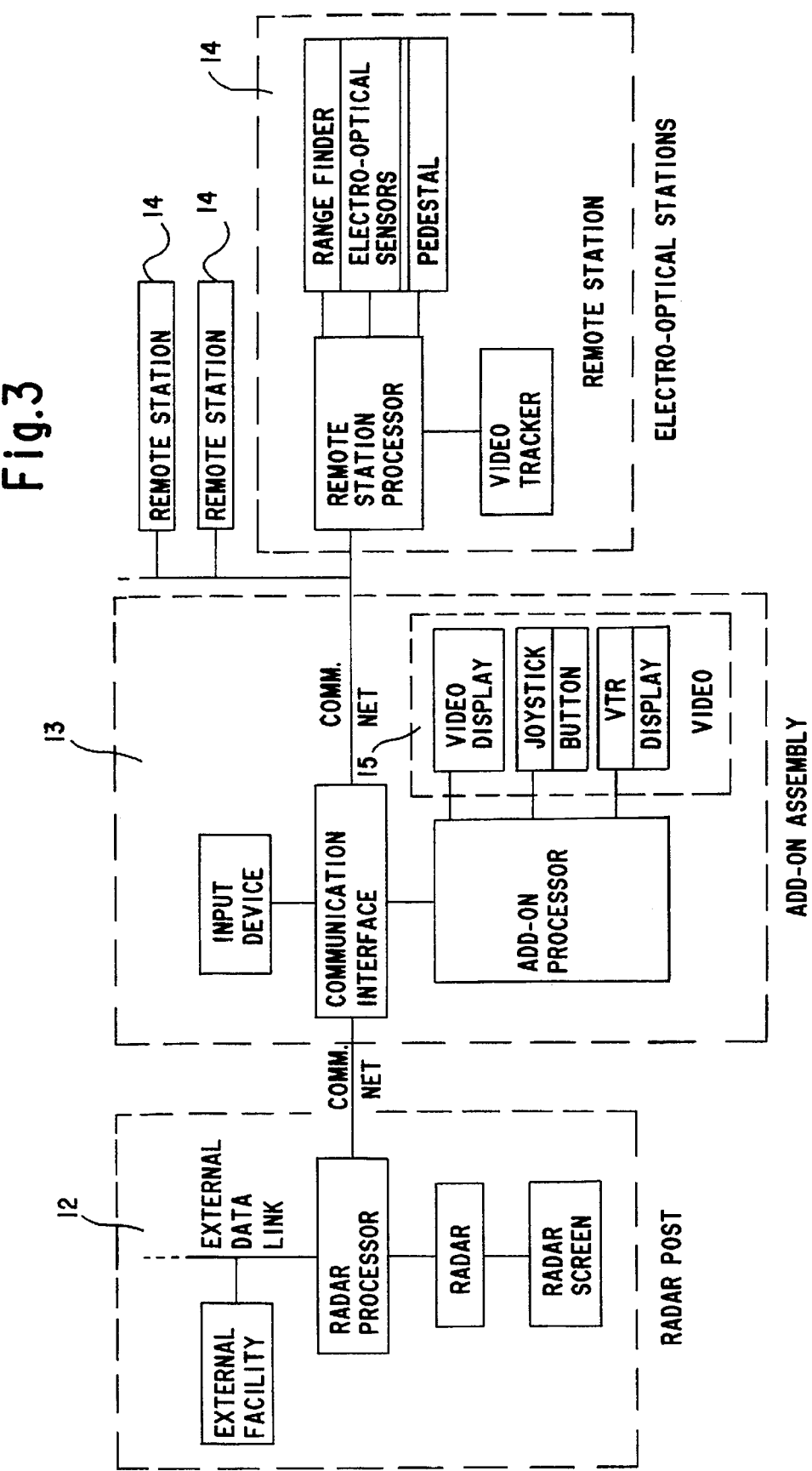
FIG. 3 is a diagram of a surveillance system according to the invention showing the basic configuration and various optional features.

FIG. 3 is a block diagram showing a general layout of a surveillance system with radar and optical surveillance capabilities according to the invention. As shown, the system comprises a surveillance station 12 with conventional radar equipment similar to that shown in FIG. 1, and a surveillance station add-on assembly 13. The system further comprises a plurality of remote electro-optical surveillance stations 14, one of which is shown in diagrammatic detail. As further shown, the radar equipment of station 12, the surveillance station add-on assembly 13 and the various remote electro-optical surveillance stations 14 are linked by a communication net.

The surveillance station add-on assembly 13 may be in form of a compact add-on unit. It comprises an input device, a communication interface, an add-on processor and a video unit 15, which latter includes a video tracking display screen, a joystick with activation button and a video tape recording (VTR) and display unit.

Instead of being of the add-on type, the surveillance assembly 13 may also form an integral part of the radar station 12. In such a case the attribute "add-on" used in relation to the processor of assembly 13 simply signifies that this processor is additional to the regular radar processor of the radar station 12.

As shown on the right-hand side of FIG. 3, a remote electro-optical surveillance station comprises an electro-optical sensor mounted on a pedestal unit with drive means and tracking capability, a remote station processor, video-tracker means and rangefinder means, the last two being optional. Electro-optical sensor units with pedestal and drive means are commercially available, a typical example being the TOPAZ unit produced by RAFAEL, Israel. If desired, two or more electro-optical sensors may be provided in each remote station, all aligned along the same optical axis. The video-tracker means are upon a suitable command locked on a designated object.

The operation of the surveillance system according to the invention shown in FIG. 3 will now be described.

The radar equipment of surveillance station 12 tracks objects in a conventional fashion, each tracked object being preferably designated on the radar display screen by a track number and the spatial location and velocity vector of each object being stored continuously in an object database of the radar processor.

The operator may select on the radar screen an object of interest and feed its track number to the input device of the surveillance station add-on assembly 13 thereby continuously causing the latest spatial location and velocity vector of the selected object to be retrieved from the object database and passed as input via the communication interface to the add-on processor. The input device may be of any suitable kind such as a keypad, keyboard, a light pen, touch screen, and the like. The add-on processor automatically selects from its memory a single or several remote station(s) able to capture the designated object in optical coverage, and continuously transmits to the selected station(s) via the communication interface and communication net the latest spatial location and velocity vector of the selected object retrieved from the database of the radar processor, including spatial location extrapolation as required.

Either of the processors of the surveillance station add-on assembly and the selected remote station translates the spatial location and velocity vector of the selected object that relate to the surveillance station into coordinates relating to the selected remote station, and the resulting data are fed to the tracking mechanism. In consequence, the control and drive means of the pedestal now cause the electro-optics to track the object, and imaging data generated by the remote station processor are transmitted via a communication net to the communication interface of the surveillance station imaging assembly, and from there through the add-on processor to the video display.

If desired, the video surveillance display may be stored directly in any or all of the radar processor, add-on processor and remote station processor for subsequent display. In addition or in the alternative, dedicated video tape recording means (VTR) with dedicated video display means may be provided whereby the image data acquired by any remote electro-optical surveillance station is recorded and presented in real time or after a delay, as may be required.

Where, as in the embodiment of FIG. 3 the system comprises more than one remote electro-optical surveillance station and where two or more stations track simultaneously, the various images may be shown on a split screen.

Once the optical mode of the surveillance system is operational the radar mode may either continue or be switched off, as may be required. Where both surveillance modes are ongoing simultaneously, the add-on computer automatically allocates the appropriate remote stations able to follow the object and hands over the surveillance duty from any current remote station(s) that loses sight of the tracked object to any judiciously selected next remote station(s).

The system may also operate by video tracking mode, whereby a cross-hair generated by a video tracker of a remote station is forwarded via the communication net, communication interface and add-on processor for display on the video display where its emplacement can be controlled by the joystick. When an object is selected with the cross-hair on the video tracking display, the activation button is depressed for video tracking lock-on.

In the locked-on state the video tracker becomes master of the slaved-in pedestal control and drive means and in this way follows the video-tracked object. During tracking, the control means also measure the elevation and azimuth angles of the line of sight to the tracked object and feeds these data back to the add-on processor.

Instead of an actuation button located on the joystick any other means of control of the cross-hair may be used, such as a tracking ball with a button or a mouse with any lock-on indicating device, and the like.

As shown in FIG. 3, a remote electro-optical surveillance station in a surveillance system according to the invention may also comprise a rangefinder as an optional feature. In the absence of a rangefinder and where only one remote station is video tracking at a time, the radar tracking is needed during the video mode for handing the surveillance duty over from a current remote station to another, because the range of the object is available only from the radar.

Alternatively, where the remote electro-optical surveillance stations do not include rangefinder means, the range may be determined by having at least two electro-optical surveillance stations video tracking simultaneously, whereby the range can be computed by triangulation methods.

It is thus seen that, in a dual-mode surveillance system according to the invention, the assignment of video tracking from a current remote station to another is effected autonomously on the basis of range finding by any of the following operational regimens:

i) by operation of the radar tracking mode;

ii) by means of range finder means fitted on each of the remote electro-optical surveillance stations; or iii) by operating in the optical tracking mode simultaneously at least two electro-optical surveillance stations which are all in sight of the object.

When the surveillance system operates in electro-optical tracking mode only, control may be returned to the radar system by transmission of tracking data from the add-on processor to the radar processor.

The dual-mode surveillance system according to the invention has many civil and military applications, a typical application being surveillance and target identification in an air defense system, for example an active radar guided air defense system.

What we claim is:

1. A surveillance system comprising:
   i) a manned surveillance station with radar surveillance equipment including a radar device, a radar display screen and a radar processor means;
   ii) at least one electro-optical surveillance station having tracking capability, being remote to said manned surveillance station and comprising a) at least one electro-optical sensor means for acquiring imaging data, said at least one electro-optical sensor means mounted on a pedestal with tracking drive means for tracking an object and said at least one electro-optical sensor means having at least two degrees of rotational freedom for azimuth and elevational adjustments; and b) remote station processor means for receiving travel path characterizing data of a moving object acquired by said radar equipment, for processing imaging data acquired by said electro-optical sensor means and for transmitting said imaging data to said manned surveillance station; and
   iii) an imaging assembly added to said manned surveillance station, comprising a video display means for displaying an image, add-on processor means, in association with said video display means for processing said imaging data transmitted by said at least one electro-optical surveillance station, and communication interface means for linking each of said at least one electro-optical surveillance station, add-on processor means and radar processor means wherein a detected object is imaged and displayed by said video display means.

2. The surveillance system according to claim 1, wherein each electro-optical surveillance station comprises video tracker means for generating tracking commands for the pedestal with tracking drive means.

3. The surveillance system according to claim 1, wherein each electro-optical surveillance station is fitted with range finder means, aligned with the electro-optical line of sight, for determining range of the detected object.

4. The surveillance system according to claim 1, wherein the surveillance station comprises means for the storage, retrieval and display of imaging data.

5. The surveillance system according to claim 4, comprising a video tape recording and display unit.

6. The surveillance system according to claim 1, comprising a plurality of electro-optical surveillance stations forming together with said add-on processor a network with autonomous decision-making capability for assigning tracking duty to a selected electro-optical surveillance station in such a manner that when a tracked object reaches a spatial section of a surveilled region that is invisible by a current tracking electro-optical surveillance station, the optical tracking duty is automatically assigned to another station from which the target is visible.

7. A surveillance system according to claim 1, wherein said at least one electro-optical surveillance station is mobile, each electro-optical surveillance station comprising means for reporting its location.

8. An electro-optical surveillance station with tracking capability for use in a surveillance system, comprising:
   at least one electro-optical sensor means mounted on a pedestal with tracking drive means for tracking a object and said at least one electro-optical sensor means having at least two degrees of rotational freedom for azimuth and elevational adjustment; and processor means for receiving radar-acquired data and for processing images acquired by the electro-optical sensor means.

9. The electro-optical surveillance station according to claim 8, comprising video tracker means for generating tracking commands for the pedestal tracking drive means.

10. The electro-optical surveillance station according to claim 8, comprising range finder means, aligned with the electro-optical line of sight, for determining range of a detected object.

11. An add-on imaging assembly for hooking on to radar equipment in a surveillance system, comprising:
    added video display means for displaying an image;
    add-on processor means, in combination with said added video display means, for processing imaging data transmitted by said surveillance system; and
    communication interface means for linking said surveillance system and add-on processor means.

12. The add-on imaging assembly according to claim 11, also comprising means for the storage and retrieval of imaging data.

13. The add-on imaging assembly according to claim 12, comprising a video tape recording and display unit.

* * * * *